United States Patent [19]

Endo et al.

[11] Patent Number: 5,009,436
[45] Date of Patent: Apr. 23, 1991

[54] MAGNETIC FLUID SEAL ASSEMBLY

[75] Inventors: Mineyo Endo; Kiyoyoshi Takegami, both of Oumihachiman; Noriaki Hishida, Kyoto; Itsuo Miyaji, Youkaichi, all of Japan

[73] Assignee: Nippon Densan Corporation, Kyoto, Japan

[21] Appl. No.: 284,736

[22] Filed: Dec. 15, 1988

[30] Foreign Application Priority Data

Jul. 11, 1988 [JP] Japan ................................ 63-91670

[51] Int. Cl.$^5$ .................... F16J 15/40; F16C 33/82
[52] U.S. Cl. ................................. 277/80; 277/135; 384/446; 384/477
[58] Field of Search ............... 277/80, 135; 384/446, 384/477, 133

[56] References Cited

U.S. PATENT DOCUMENTS

| | | | |
|---|---|---|---|
| 3,240,341 | 3/1966 | Rosaen | 277/80 X |
| 3,834,775 | 9/1974 | Tuffias | . |
| 4,293,137 | 10/1981 | Ezekiel | 277/80 |
| 4,407,508 | 10/1983 | Raj | . |
| 4,424,974 | 1/1984 | Mitsuya | . |
| 4,486,026 | 12/1984 | Furumura | . |
| 4,502,700 | 3/1985 | Gowda et al. | 277/80 |
| 4,519,010 | 5/1985 | Elsaesser | . |
| 4,526,379 | 7/1985 | Raj | 277/80 |
| 4,526,382 | 7/1985 | Raj et al. | 277/80 |
| 4,565,379 | 1/1986 | Ballhaus | 277/80 X |
| 4,817,964 | 4/1989 | Black, Jr. | 277/80 X |

FOREIGN PATENT DOCUMENTS

| | | |
|---|---|---|
| 0267632 | 5/1988 | European Pat. Off. . |
| 8518880 | 7/1949 | Fed. Rep. of Germany . . |
| 2621352 | 12/1977 | Fed. Rep. of Germany . |
| G8805661 | 8/1988 | Fed. Rep. of Germany . |
| 1178840 | 5/1959 | France ............... 277/80 |
| 2065847 | 8/1971 | France . |
| 91066 | 5/1985 | Japan ................ 277/80 |
| 626672 | 3/1986 | Japan ................ 277/80 |
| 112868 | 5/1986 | Japan ................ 277/80 |
| 266873 | 11/1986 | Japan ................ 277/80 |
| 773353 | 10/1980 | U.S.S.R. ............ 277/80 |
| 817352 | 3/1981 | U.S.S.R. ............ 277/80 |
| 2130662 | 6/1984 | United Kingdom ... 277/80 |

Primary Examiner—Allan N. Shoap
Attorney, Agent, or Firm—William H. Eilberg

[57] ABSTRACT

A magnetic fluid seal assembly comprising an annular sealing clearance communicating with an external space, an annular permanent magnet for forming a magnetic field in the sealing clearance, a ferromagnetic fluid retained in the sealing clearance by the magnetic field but rotationally movable in the sealing clearance, and a scattering preventive portion provided axially outwardly of the sealing clearance for preventing the ferromagnetic fluid from scattering to the external space when the ferromagnetic fluid is rotationally moved.

9 Claims, 4 Drawing Sheets

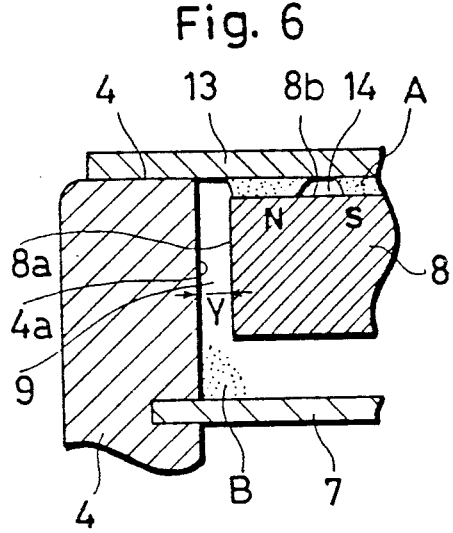
Fig. 6
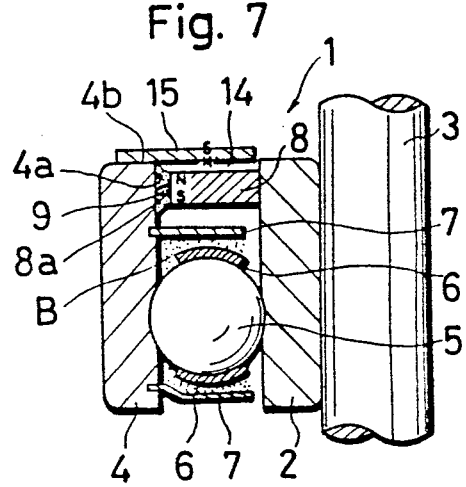
Fig. 7
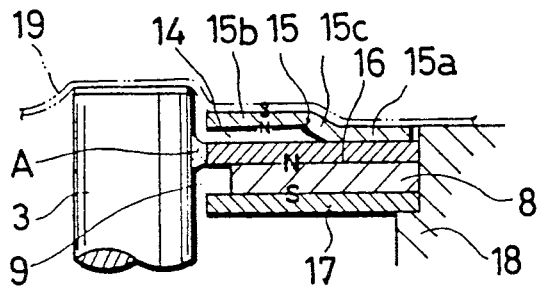
Fig. 8
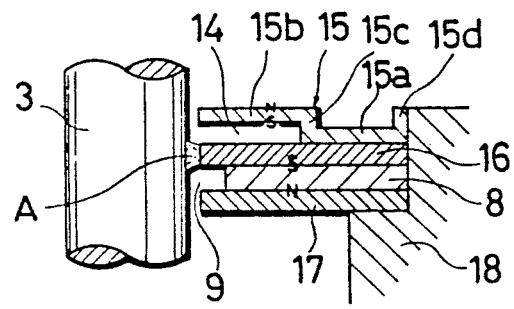
Fig. 9
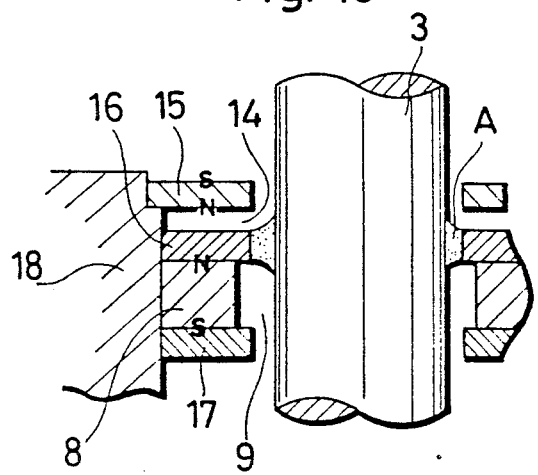
Fig. 10
Fig. 11

MAGNETIC FLUID SEAL ASSEMBLY

BACKGROUND OF THE INVENTION

1. Field of the Invention

This invention relates generally to seals, and more particularly to a magnetic fluid seal assembly which is advantageously used to seal a small annular clearance between two relatively rotatable parts.

2. Description of the Prior Art

In small-sized high precision motors, it is often required to use such a seal or seals as would enable effective sealing between two relatively rotatable parts without hindering smooth rotation therebetween. One typical example of seals meeting such a requirement is the so-called "magnetic fluid seal" which utilizes ferromagnetic particles dispersed in a carrier fluid such as oil.

A magnetic fluid seal is disclosed for example in U.S. Pat. No. 4,407,508 to Raj et al. According this U.S. patent, the seal comprises an annular pole piece surrounding a rotary shaft with a small annular clearance formed therebetween. The pole piece is held in contact with permanent magnet, so that a magnet flux runs within the annular clearance to magnetically retain a ferromagnetic fluid loaded into the clearance.

Because of its fluidity, the ferromagnetic fluid ensures smooth rotation of the shaft while effectively sealing the annular clearance. However, such fluidity of the ferromagnetic fluid also gives rise to a possibility of being centrifugally scattered when rotationally moved with the shaft, causing a loss of the expensive material and more importantly resulting in contamination of the surrounding.

Particularly in spindle motors used for driving data carrier discs (magnetic discs, optical discs, etc.), the contamination of the space adjacent the disc should be avoided because this may hinder reliable write-in and read-out operation. Therefore, some countermeasure to prevent scattering of ferromagnetic fluid is absolutely necessary when it is used to provide a seal for the spindle motor.

SUMMARY OF THE INVENTION

It is, therefore, an object of the invention to provide a magnetic fluid seal assembly which enables effective sealing without scattering of the ferromagnetic material.

Another object of the invention is to provide a magnetic fluid seal assembly which is capable of preventing magnetic leakage from a permanent magnet incorporated in the assembly in addition to the scattering prevention.

Still another object of the invention is to provide a magnetic fluid seal assembly which additionally eliminates the possibility of the ferromagnetic fluid coming into contact with an operator's finger or fingers during handling of the seal assembly.

A further object of the invention is to provide a magnetic fluid seal assembly which additionally prevents mixing of the ferromagnetic fluid with grease used to lubricate a bearing.

According to the invention, there is provided a magnetic fluid seal assembly comprising: an annular sealing clearance communicating with an external space; annular magnetizing means for forming a magnetic field in the clearance; a ferromagnetic fluid retained in the clearance by the magnetic field but rotationally movable in the clearance; and scattering preventive means provided axially outwardly of the annular clearance for preventing the ferromagnetic fluid from scattering to the external space when the ferromagnetic fluid is rotationally moved.

The scattering preventive means may be in the form of an annular pocket or cover or projection provided axially outwardly of the sealing clearance. The annular cover may be made of a magnetic material (material having a high magnetic permeability) or a permanently magnetized material.

Other objects, features and advantages of the invention will be fully understood from the following description of the preferred embodiments given with reference to the accompanying drawings.

BRIEF DESCRIPTION OF THE DRAWINGS

In the accompanying drawings:

FIG. 6 is an enlarged sectional view showing a principal portion of the seal assembly shown in FIG. 5;

FIG. 7 is a view in section showing a ball bearing which incorporates a magnetic fluid seal assembly according to a fourth embodiment of the invention;

FIG. 8 is a view in section showing a magnetic fluid seal assembly according to a fifth embodiment of the invention as mounted in a spindle motor;

FIG. 9 is a view in section showing a magnetic fluid seal assembly according to a sixth embodiment of the invention as mounted in a spindle motor;

FIG. 10 is a view in section showing a magnetic fluid seal assembly according to a seventh embodiment of the invention as mounted in a spindle motor;

FIG. 11 is a view in section showing a magnetic fluid seal assembly according to a eighth embodiment of the invention as mounted in a spindle motor;

DETAILED DESCRIPTION OF THE PREFERRED EMBODIMENTS

Figure 1:
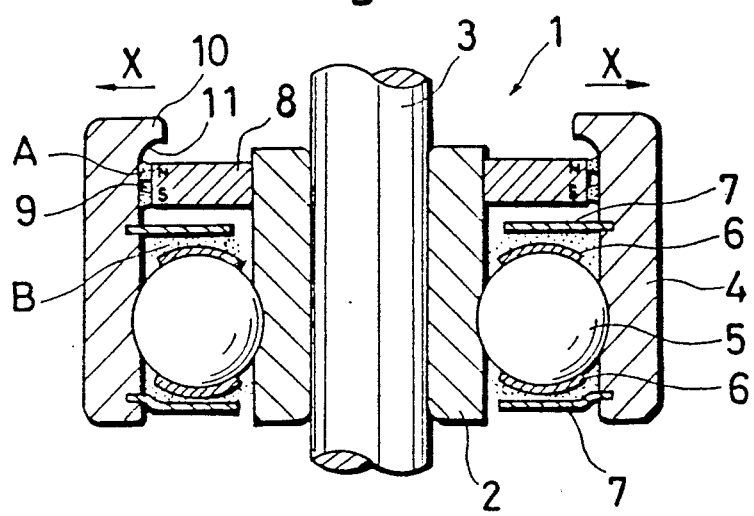
FIG. 1 is a view in section showing a ball bearing which incorporates a magnetic fluid seal assembly according to a first embodiment of the invention.

Throughout the accompanying drawings, identical or similar parts are referred to by the same reference numerals and characters for the convenience of explanation.

Referring to FIG. 1 of the accompanying drawings, there is illustrated a ball bearing 1 which incorporates a magnetic fluid seal assembly according to the first embodiment of the invention. The bearing 1 includes an inner race 2 fitted on a central shaft 3, an outer race 4 surrounding the inner race 2, and an annular series of balls 5 interposed between the two races 2, 4. The balls 5 are suitably held by a pair of annular retainers 6. A pair of grease seal plates 7 extend radially inward from the outer race 4 to a point somewhat short of the inner race 2, so that an annular space is formed which is loaded with grease B to ensure smooth relative rotation between the two races.

The magnetic fluid seal assembly is arranged at one end of the bearing 1 and includes an annular permanent magnet 8 fitted around the inner race 2 of the bearing to extend toward the outer race 4. The magnet 8 has an outer circumferential surface 8a which is slightly spaced from the inner circumferential surface 4a of the outer race 4 to define a small annular sealing clearance 9 which extends axially of the bearing.

Figure 2:
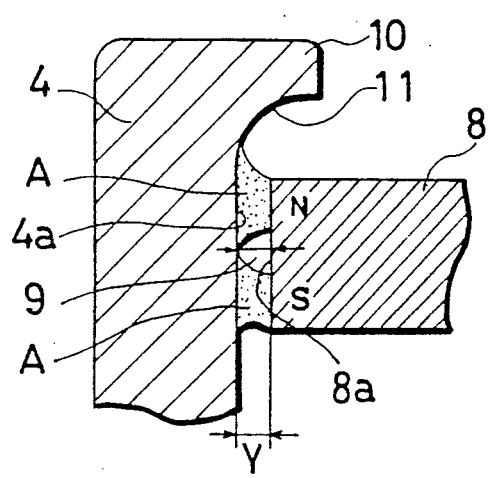
FIG. 2 is an enlarged sectional view showing a principal portion of the seal assembly shown in FIG. 1.

As better illustrated in FIG. 2, the outer circumferential surface 8a of the permanent magnet 8 provides a pair of magnetically opposite poles N, S at axially spaced positions. Thus, when a suitable amount of ferromagnetic fluid A is supplied into the sealing clearance 9, the fluid separately collects at the N- and S-poles where the magnetic flux density is highest. The thus collected magnetic fluid effectively seals the annular clearance 9 while ensuring smooth relative rotation between the two bearing races 2, 4.

According the embodiment illustrated in FIGS. 1 and 2, the outer race 4 has an annular integral projection 10 extending radially inward at a position axially outwardly of the sealing clearance 9 to provide an annular concave surface 11 adjoined thereby. The distance from any point of the concave surface 11 to any surface portion of the permanent magnet 8 is larger than the size Y of the sealing clearance 9. Thus, the magnetic flux density between permanent magnet 8 and the concave surface 11 is lower than that within the sealing clearance 9, so that the magnetic fluid A will tend to collect within the sealing clearance 9.

In the case of incorporating the bearing 1 into a spindle motor (not shown), the central shaft 3 together with the inner race 2 may be held stationary, whereas the outer race 4 may be fitted in a rotor or hub (not shown) which drivingly supports one or more hard memory discs. In this case, the outer race 4 rotates relative to the stationary inner race 2. Alternatively, the outer race 4 may be fitted in a stationary mount (not shown), whereas the central shaft 3 which is rotatable supports a rotor or hub. In this case, the inner race 2 rotates relative to the stationary outer race 4.

When the two bearing races 2, 4 are relatively rotated as above, the magnetic fluid A is also moved rotationally within the annular sealing clearance 9 with a centrifugal force X (see FIG. 1) acting thereon. This centrifugal force X may tend to cause a portion of the magnetic fluid A to separate from the remaining portion. In fact, however, the concave surface 11 will utilize the centrifugal force X to guide such a portion of the magnetic fluid to return to the sealing clearance 9. In this way, the magnetic fluid A is effectively prevented from scattering into the external space, thereby ensuring a contamination-free condition to avoid adversely affecting data carrier discs in the case of a spindle motor.

Figure 3:
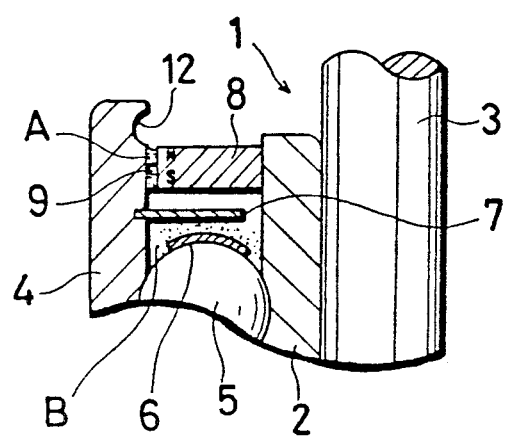
FIG. 3 is a view in section showing a ball bearing which incorporates a magnetic fluid seal assembly according to a second embodiment of the invention.
Figure 4:
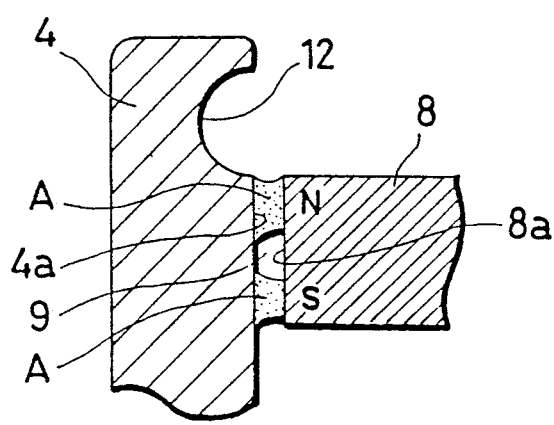
FIG. 4 is an enlarged sectional view showing a principal portion of the seal assembly shown in FIG. 3.

FIGS. 3 and 4 show another ball bearing 1 which incorporates a magnetic fluid seal assembly according to the second embodiment of the invention. In this embodiment, the inner circumferential surface 4a of the bearing outer race 4 is formed with an annular groove 12 at a position axially outwardly of the sealing clearance 9 to provide a pocket for fluid collection. The annular groove 12 is preferably arcuate or semi-circular in cross section but may have a different cross-sectional shape. The second embodiment is otherwise the same as the first embodiment.

According to the second embodiment, the magnetic flux density provided by the permanent magnet 8 is higher in the annular sealing clearance 9 than in the annular groove or pocket 12, so that the ferromagnetic fluid A will tend to collect within the sealing clearance 9. Upon relative rotation between the two bearing races 2, 4, a portion of the magnetic fluid A may be allowed to be centrifugally separated from the remaining portion. However, the annular pocket 12 serves to collect such a fluid portion which will be ultimately guided down into the sealing clearance 9 (where the magnetic flux density is higher) when relative rotation between the two races 2, 4 is stopped. In this way, it is possible to prevent scattering of the magnetic fluid A.

The annular groove 12 may be machined or formed very easily. Further, the absence of radially inward projections on the outer race 4 enables insertion of the permanent magnet from above, thereby facilitating mounting of the seal assembly into the bearing 1.

Figure 5:
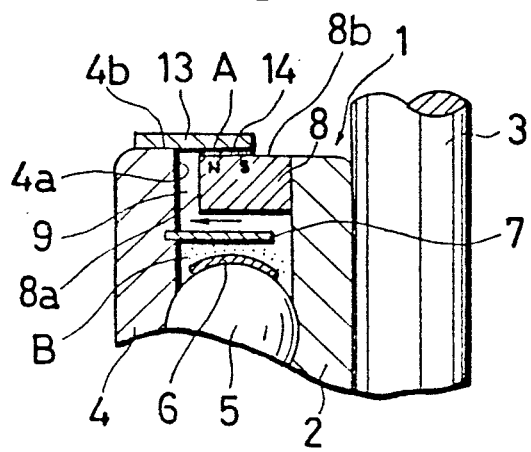
FIG. 5 is a view in section showing a ball bearing which incorporates a magnetic fluid seal assembly according to a third embodiment of the invention.

According to the third embodiment of the invention illustrated in FIGS. 5 and 6, the axially extending annular clearance 9 formed between the inner circumferential surface 4a of the bearing outer race 4 and the outer circumferential surface 8a of the permanent magnet 8 is not used for sealing purposes. Instead, an annular cover 13 made of a magnetic material (high in magnetic permeability but not permanently magnetized) is attached to an end face 4b of the outer race 4 to extend radially inward in parallel to the permanent magnet 8, so that an annular sealing clearance 14 extending radially is formed between the annular cover 13 and the magnet 8. The magnet 8 has an axially outer surface 8b providing a pair of magnetically opposite poles N, S. Further, the size Z of the sealing clearance 14 is smaller than the width Y of the axially extending clearance 9 to ensure that the magnetic flux density is higher in the sealing clearance 14 than in the axially extending clearance 9. As a result, the ferromagnetic fluid A is collectively retained within the sealing clearance 14.

Upon relative rotation between the inner and outer races 2, 4, a centrifugal force X tends to move the magnetic fluid A further into the seal clearance 14 but not to the extent that the fluid A actually moves into the axially extending clearance 9 against the magnetic attraction of the permanent magnet 8. In other words, the centrifugal force X, when combined with the covering function of the annular cover 13, acts to prevent scattering of the magnetic fluid A. Thus, the annular cover 13 provides a dual function of preventing fluid scattering and forming the sealing clearance 14.

The axially extending clearance 9, on the other hand, serves to prevent the grease B from mixing with the magnetic fluid A. More specifically, a portion of the grease B, if happening to flow into the space immediately under the magnet 8, is centrifugally brought to the inner circumferential surface 4a of the outer race 4 to be deposited thereon. However, the axially extending clearance 9 is enough to keep such a grease portion away from the magnetic fluid A.

FIG. 7 illustrates a further bearing 1 which incorporates a magnetic fluid seal assembly according to the fourth embodiment of the invention. The seal assembly of this embodiment looks similar to the seal assembly of the third embodiment but differs therefrom in the following respects.

The axially extending annular clearance 9 formed between the outer circumferential surface 8a of the permanent magnet 8 and the inner circumferential surface 4a of the bearing outer race 4 is used for sealing. For this purpose, the outer circumferential surface 8a of the magnet provides a pair of magnetically opposite poles N, S to retain the ferromagnetic fluid A within the sealing clearance 9. An annular cover 15, which is made of a permanently magnetized material, is attached to an end face 4b of the outer race 4 to extend radially inward in parallel to the permanent magnet 8, so that a radially extending annular clearance 14 is formed between the permanent magnet 8 and the permanently magnetic annular cover 15.

The permanently magnetic cover 15 has an N-pole located closer to the N-pole of the permanent magnet 8. As a result, substantially no magnetic flux passes across the radially extending clearance 14 to prevent magnetic leakage both from the permanent magnet 8 and the permanently magnetic cover 15 to the exterior. In other words, the radially extending clearance 14 formed between both magnets 8, 15 cuts off any magnetic flux loops (bridging from the N-pole to the S-pole) which may extend to the space outside the bearing 1.

According the fourth embodiment of FIG. 7, the annular cover 15, which is permanently magnetized, fulfils three functions. Firstly, the cover 15 works to prevent scattering of the ferromagnetic fluid A during relative rotation between the two bearing races 2, 4. Secondly, it excludes magnetic leakage which may adversely affect magnetic data carrier discs in the case of spindle motors. In the third place, it prevents an operator's finger or fingers from coming into direct contact with the magnetic fluid A during handling or mounting of the bearing 1.

FIG. 8 shows a magnetic fluid seal assembly according to the fifth embodiment of the invention. The seal assembly of this embodiment differs basically from those of the foregoing embodiments in that it is not incorporated in a ball bearing but interposed between a stationary central shaft 3 and a rotor or hub 18 of a spindle motor for rotationally driving one or more data carrier discs (not shown).

Specifically, an annular permanent magnet 8 axially sandwiched between a pair of annular pole pieces or plates 16, 17 is fitted in the hub 18 to extend radially inward, so that an axially extending annular sealing clearance 9 is formed between the shaft 3 and the magnet 8 (including the pole plates 16, 17). According to the illustrated example, the upper pole plate 16 provides an N-pole, while the lower pole plate 17 provides an S-pole. An amount of ferromagnetic fluid A is loaded only between the shaft 3 and the upper pole plate 16 although a further amount of ferromagnetic fluid A may also be supplied between the shaft 3 and the lower pole plate 17.

Superposed on the upper pole plate 16 is an annular cover 15 which is made of a permanently magnetized material. The cover has a radially outer portion 15a attached to the upper pole plate 16 as by an adhesive, and a radially inner portion 15b slightly raised from the outer portion 15a by a slanting intermediate portion 15c to define a radially extending annular clearance 14. This annular clearance serves as a pocket for receiving a centrifugally scattered portion of the magnetic fluid A when the hub 18 is rotated about the central shaft 3.

The radially inner portion 15b of the cover 15 provides an N-pole arranged closer to the N-pole plate 16 to prevent magnetic leakage, as described before. The cover 15 also serves to prevent the magnetic fluid A from coming into contact with an operator's finger or fingers as well as with a wrapping sheet 19 which may be applied to protect the spindle motor before being incorporated into a drive unit (not shown).

FIG. 9 shows a magnetic fluid seal assembly (sixth embodiment of the invention) which is very similar to the seal assembly of FIG. 8 but slightly differs therefrom in the following respects. As illustrated, the annular magnet cover 15 has an upright intermediate portion 15c between the radially outer portion 15a and the radially inner portion 15b. The radially outer portion 15a is formed with an annular axial projection 15d to be press-fitted on the hub 18 of the spindle motor. Further, the radially inner portion 15b provides an S-pole positioned closer to the upper pole plate 16 which also serves as an S-pole of the magnet 8.

The seventh embodiment shown in FIG. 10 employs an annular magnet cover 15 which is slightly spaced in its entirety from the upper pole plate 16 to define a radially extending annular clearance 14 serving as a pocket. Apparently, the cover 15 works substantially in the same manner as the covers shown in FIGS. 8 and 9.

Figure 12:
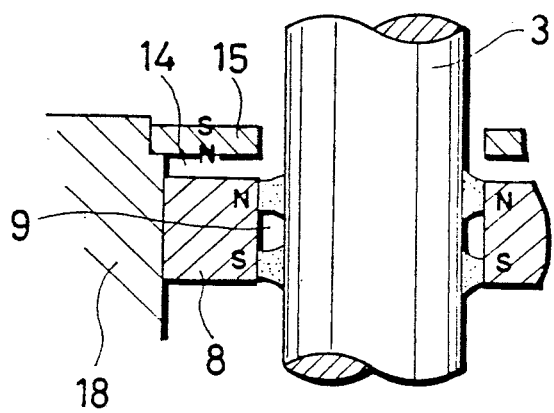
FIG. 12 is a view in section showing a magnetic fluid seal assembly according to a ninth embodiment of the invention as mounted in a spindle motor.

The eighth and ninth embodiments illustrated in FIGS. 11 and 12 correspond respectively to the fifth and seventh embodiments of FIGS. 8 and 10 except for the absence of the magnetic pole pieces or plates 16, 17 and for the loading of the ferromagnetic fluid A at both magnetic poles of the permanent magnet 8.

In any of the embodiments illustrated in FIGS. 8 to 12, the central shaft 3 may be made rotatable instead of being stationary. In this case, the shaft 3 supports a hub (not shown) on which one or more data carrier discs are fitted, whereas a part designated by reference numeral 18 constitutes a stationary mount for rotatably supporting the shaft 3 by means of bearings (not shown).

Any of the foregoing embodiments has some means for preventing centrifugal scattering of the ferromagnetic fluid A, and such scattering prevention is a common feature to be claimed in this application. On the other hand, it should be appreciated that the arrangement (see FIGS. 1 to 6) in which a magnetic fluid seal assembly is incorporated into a ball bearing is also new and advantageous in ensuring compactness. In the description to follow, therefore, various alternative arrangements for a ball bearing incorporating a magnetic fluid seal assembly will be explained for the purpose of disclosure.

Figure 13:
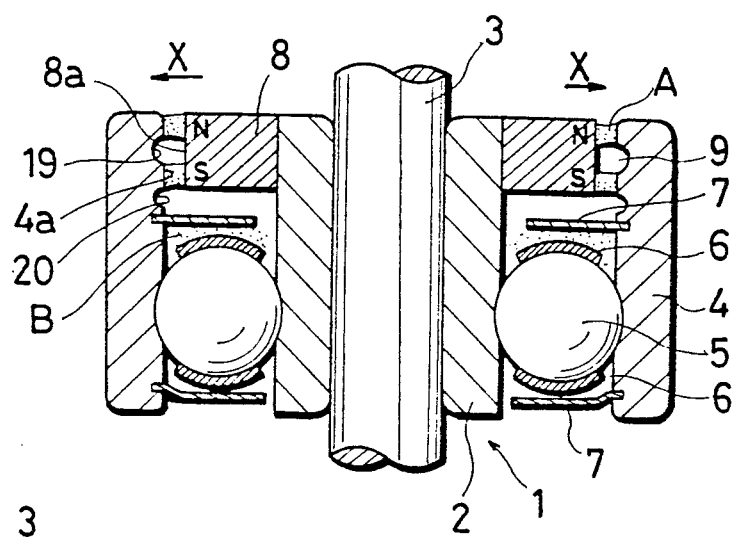
FIGS. 13 to 19 are sectional views for the purpose of disclosure only and each showing a ball bearing which incorporates a different type of magnetic fluid seal assembly.

FIG. 13 shows a ball bearing 1 which is similar in basic arrangement to that illustrated in FIG. 1 but lacks a scattering preventive portion which positively prevents the ferromagnetic fluid A from being centrifugally scattered. Instead, the inner circumferential surface 4a of the bearing outer race 4 is formed with an annular recess 19 at a position between the two magnetic poles N, S of the annular permanent magnet 8 as well as with an auxiliary annular recess 20 at a position axially inwardly of the first-mentioned recess 19. These recesses 19, 20 increase the magnetic flux density at the two magnetic poles of the permanent magnet 8 to concentratively retain the magnetic fluid A within the annular sealing clearance 9. Further, the auxiliary annular recess 20 serves to receive a portion of the grease B which may happen to enter the space between the magnet 8 and the adjoining grease seal plate 7.

Figure 14:
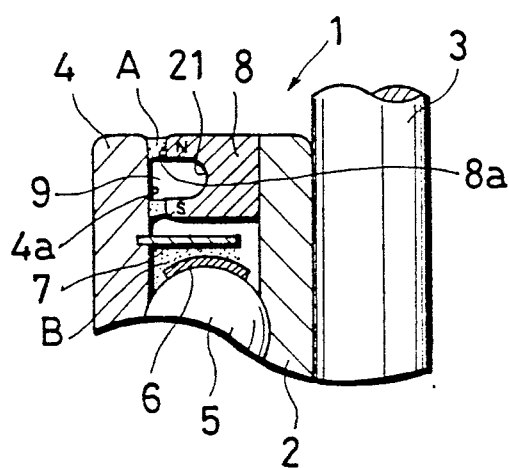

In another ball bearing shown in FIG. 14, the outer circumferential surface 4a of the permanent magnet 8 is formed with an annular recess 21 between the two magnetic poles N, S, whereas the inner circumferential surface 4a of the bearing outer race 4 is not formed with such a recess. Obviously, the annular recess 21 fulfils the same function as described above. The permanent magnet 8 has rounded circumferential edges 8c which further assist localized concentration of the magnetic flux at the two poles N, S of the magnet 8. In fact, the rounded circumferential edges 8c combined with the annular recess 21 will provide good retention of the ferromagnetic fluid A within the annular sealing clearance 9 to prevent centrifugal scattering thereof to some extent.

Figure 15:
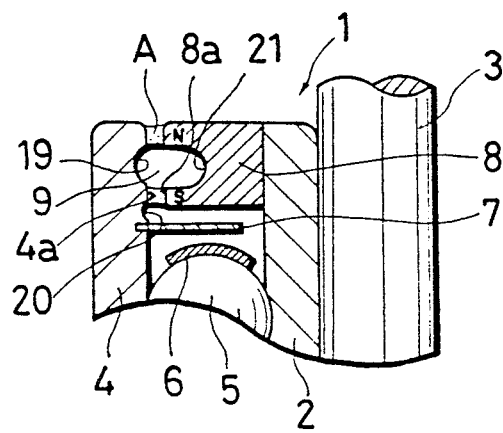

FIG. 15 shows a further ball bearing 1 which corresponds to a combination of the arrangements shown in FIGS. 13 and 14. As shown, the outer circumferential surface 8a of the annular permanent magnet 8 is formed with a first annular recess 21 between the two magnetic poles N, S, whereas the inner circumferential surface 4a of the bearing outer race 4 is formed with a second annular recess 19 at a position opposite the first annular recess as well as with a third or auxiliary annular recess 20 at a position axially inwardly of the second annular recess 19. Further, the permanent magnet 8 has rounded circumferential edges 8c. Obviously, the annular recesses 19, 20, 21 and the rounded circumferential edges 8c all contribute to good retention of the ferromagnetic fluid A within the annular sealing clearance 9.

Figure 16:
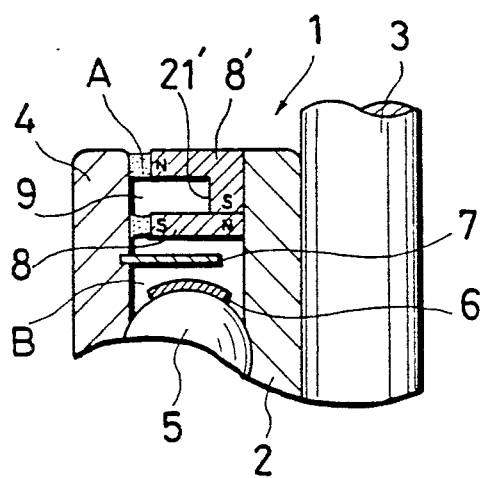

Still another ball bearing illustrated in FIG. 16 comprises a first permanent magnet 8' which is L-shaped in cross section, and a second permanent magnet 8" which is flat. Thus, the two permanent magnets 8', 8", when joined together, define an annular recess 21' which is similar in function to the annular recess 21 shown in FIG. 14. The first magnet 8' provides two magnetically opposite poles N, S with the N-pole positioned closer to the outer race 4. Similarly, the second magnet 8" provides two magnetic poles N, S, but the S-pole thereof is positioned closer to the outer race. The S-pole of the first magnet 8' is located in contact with the N-pole of the second magnet 8", thereby making it easy to hold the two magnets together.

Figure 17:
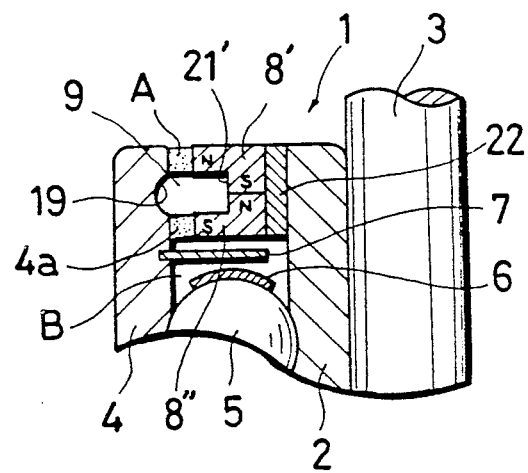

FIG. 17 shows a slight modification in which two magnets 8', 8" are L-shaped in cross section to define a first annular recess 21' when joined together. The inner circumferential surface 4a of the bearing outer race 4 is also formed with a second annular recess 19 which cooperates with the first annular recess 21 to provide magnetic flux concentration. Indicated at 22 is a mounting ring which is used to mount the joined magnets 8', 8" on the inner race 2.

Figure 18:
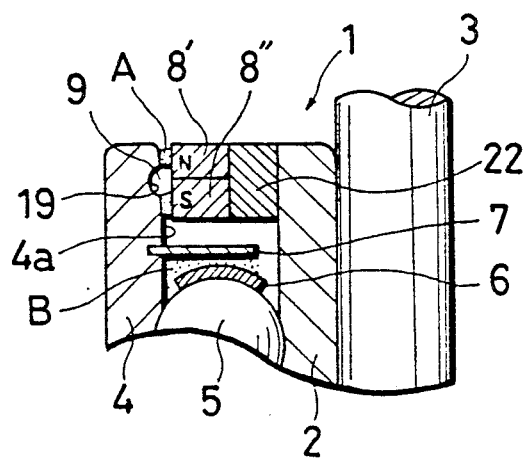

According to a further arrangement shown in FIG. 18, a first annular permanent magnet 8', which is flat, provides only an N-pole adjacent to the bearing outer race 4, whereas a second annular permanent magnet 8''', which is also flat, provides only an S-pole adjacent to the outer race 4. Thus, the two magnets, when joined together and mounted to the inner race 2 by means of a mounting ring 22, works like a single magnet. The concentration of magnetic flux is provided by an annular recess 19 formed on the inner circumferential surface 4a of the outer race 4.

Figure 19:
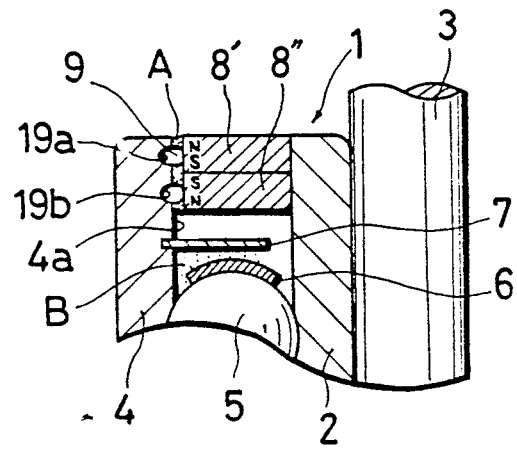

In FIG. 19, finally, there is illustrated an arrangement in which each of two annular permanent magnets 8', 8" provides two magnetic poles N, S located close to the bearing outer race 4, and the S-pole of one magnet 8' adjoins the S-pole of the other magnet 8". The inner circumferential surface 4a is formed with a pair of annular recesses 19a, 19b opposed to the respective magnets 8', 8", so that the ferromagnetic fluid A is retained as triply separated within the sealing clearance 9.

The invention being thus described, it is obvious that the same may be varied in many other ways. Such variations are not to be regarded as a departure from the spirit and scope of the invention, and all such modifications as would be obvious to those skilled in the art are intended to be included within the scope of the following claims.

We claim:

1. A magnetic fluid seal assembly which is arranged between a stationary central shaft and a rotor rotatable about said central shaft, said seal assembly comprising:

an annular sealing clearance formed around said central shaft;

annular magnetizing means mounted on said rotor and surrounding said sealing clearance for forming a magnetic field in said sealing clearance;

ferromagnetic fluid retained in said clearance by said magnetic field; and an annular cover provided separately from and arranged axially outwardly of said magnetizing means, said cover forming a second annular clearance surrounding said central shaft at a position axially outwardly of said sealing clearance, said cover further forming an annular pocket located between said sealing and second clearances to open toward said central shaft;

wherein said cover and magnetizing means have adjacent, opposed faces, and wherein said cover is permanently magnetized in a manner such that said adjacent, opposed faces of said cover and said magnetizing means are identical in magnetic polarity;

wherein said second clearance is arranged substantially in axial alignment with said sealing clearance, and wherein said second clearance is normally substantially free of ferromagnetic fluid.

2. The seal assembly as defined in claim 1, wherein said sealing and second clearances directly adjoin said central shaft.

3. The seal assembly as defined in claim 1, wherein said magnetizing means comprises an annular permanent magnet arranged around said central shaft.

4. The seal assembly as defined in claim 3, wherein said permanent magnet is axially sandwiched between a pair of annular pole pieces.

5. The seal assembly as defined in claim 3, wherein said annular cover has a radially outer portion directly fixed to said permanent magnet, and a radially inner portion slightly raised from said permanent magnet to define said annular pocket.

6. The seal assembly as defined in claim 1, wherein said annular cover has a radially outer portion fixed to said magnetizing means, and a radially inner portion slightly raised from said magnetizing means to define said annular pocket between said inner portion and said magnetizing means.

7. The seal assembly as defined in claim 6, wherein said inner and outer portions of said annular cover are connected by a slanting intermediate portion.

8. The seal assembly as defined in claim 6, wherein said inner and outer portions of said annular cover are connected by an upright intermediate portion.

9. The seal assembly as defined in claim 1, wherein said annular cover is directly mounted on said rotor and entirely spaced from said magnetizing means in parallel thereto.

* * * * *